United States Patent [19]
Hebbel et al.

[11] 3,865,685
[45] Feb. 11, 1975

[54] MULTIPLE STEP BLEACHING OF CELLULOSE WITH A PER COMPOUND AND CHLORIDE DIOXIDE

[75] Inventors: Gerhard Hebbel, Traisa; Horst Krüger, Darmstadt; Werner Traser, Darmstadt-Arheilgen; Herbert Pfand, Wolfgang, all of Germany

[73] Assignee: Deutsche Gold- und Silber-Scheideanstalt vormals Roessler, Frankfurt (Main), Germany

[22] Filed: Apr. 16, 1973

[21] Appl. No.: 351,784

[30] Foreign Application Priority Data
Apr. 21, 1972   Germany............................ 2219504

[52] U.S. Cl...................................... 162/78, 162/88
[51] Int. Cl............................ D21c 9/14, D21c 9/16
[58] Field of Search.............. 162/78, 88, 89; 8/109, 8/111

[56] References Cited
UNITED STATES PATENTS
2,492,047   12/1949   K'Burg et al...................... 162/78 X Primary Examiner—S. Leon Bashore
Assistant Examiner—Arthur L. Corbin
Attorney, Agent, or Firm—Cushman, Darby & Cushman

[57] ABSTRACT

Cellulose is bleached with reduced use of chlorine at atmospheric pressure in a plural step process using as the only bleaching agents chlorine dioxide and a per compound, which process begins and ends with per compound steps and has alternating per compound and chlorine dioxide steps.

14 Claims, No Drawings

MULTIPLE STEP BLEACHING OF CELLULOSE WITH A PER COMPOUND AND CHLORIDE DIOXIDE

Cellulose obtained chemically, such as results for example from the sulfite process or the alkaline soda — or sulfate process, besides cellulose contains small amounts of lignin, hemicellulose and several other materials. The mentioned materials associated with cellulose, especially lignin, effect the discoloration or the yellowing of cellulose or products producted therefrom. In order to produce highly white paper and other products from cellulose which are not inclined to yellow, it is necessary after the chemical decomposition to remove the residual lignin and other disturbing associated materials in a multistep bleach. Generally three to eight steps are required. As bleaching chemicals today there are mainly added chlorine (C), chlorine dioxide (D) and sodium or calcium hypochlorite (H).

There are also used hydrogen peroxide (P) and recently molecular oxygen ($O_2$). Between the individual bleaching steps there are frequently introduced alkaline extractions (E). (C. W. Bailey and C. W. Dence, Tappi, Vol. 49, pages 9–15).

The customary bleaching sequence contains one or two chlorination steps with elemental chlorine as well as in most cases additionally one to two hypochlorite steps and one to two chlorine dioxide steps if a completely bleached cellulose (degree of whiteness = 88% MgO. or better still = 90% MgO) is to be produced. Thereby there is formed above all a large amount of hydrochloric acid in the chlorination steps where for the most part there is added 4–8% $Cl_2$ based on the cellulose so that the waste water contains large amounts of hydrochloric acid or, if it is neutralized, sodium chloride. To a lesser extent this is true also for the hypochlorite bleach. Besides the inorganic products the bleachery waste water also contains about 6 to 12 weight percent based on the cellulose of dissolved organic substances. This always means, however, a considerably loading of the drains and waters which must take up the waste water. In this connection there have been endeavors to replace the bleaching step with chlorine with one with molecular oxygen. Thereby the operation must be carried out with the use of excess pressure. Furthermore, it is open to question whether in every case the loss in strength caused by the alkaline oxygen pressure treatment can be prevented through the addition of $MgCO_3$ or MgO or other material as proposed in the literature (Schalk, German Offenlegungsschrift 2,109,542; Rowlandson, Tappi Vol. 54, No. 6, pages 962–967(1971)). As examples of the bleaching processes used today there may be mentioned the series of steps C/E/H, C/E/H/E/H, C/E/H/H, C/E/H/D, C/E/D/E/D, C/E/H/D/P/, C/E/H/D/E/D, C/E/H/E/D and C/E/H/D/H.

Recently there also has been investigated the capability of the following sequences: $A/O_2/D/E/D$, $A/O_2/H/D/E/D$, $A/O_2/D/P/D$. (A signifies an acid pretreatment, $O_2$ signifies molecular oxygen bleach) (see Rowlandson loc. cit.)

The alkaline final step is generally connected with a neutralization with sulfurous acid or others such as, for example, $H_2SO_4$ which, however, is not generally counted in the bleaching step. In the chlorination steps additional chlorine dioxide can be added. It is known to add hydrogen peroxide or sodium peroxide for the bleaching of cellulose but as a rule only in the form of a single step bleach for lower degrees of whiteness or as an endstep in a multistep complete bleach. In the latter case there is only possible a slight increase in the degree of whiteness in the peroxide step, yet a good resistance to yellowing is produced.

Until now it has not been known to add peroxides as the main bleaching agent in a complete bleach.

In contrast there has now been found a plural step process for complete bleaching of cellulose that can be operated without superatmospheric pressure and with substantially smaller amounts of chlorine than formerly, in which the cellulose, in a given case after an acid pretreatment (e.g. with sulfuric acid without an oxidative bleaching agent) in which the bleaching is carried out in the first step with a per compound, then in the second step with chlorine dioxide and in a third bleaching step there is again used a per compound.

With difficultly bleachable celluloses, as for example, sulfate celluloses, it has been found that to the true three-step bleach there can be added at least one chlorine dioxide and/or peroxide step. There has been found especially favorable the sequence which ends with a peroxide step, as for example, in the five-step sequence hydrogen peroxide (1); chlorine dioxide (2); hydrogen peroxide (3); chlorine dioxide (4); hydrogen peroxide (5). Naturally if it should be needed there can also be used a greater than three step sequence with easily bleachable celluloses.

As per compounds there can be used hydrogen peroxide, sodium peroxide and other inorganic or organic peroxides including hydroperoxides. Preferably there are used hydrogen peroxide, sodium peroxide or t-butyl hydroperoxide or mixtures of the materials in aqueous solution.

Examples of other suitable per compounds include potassium peroxide, calcium peroxide, sodium perborate, ammonium persulfate, cumene hydroperoxide, potassium persulfate, sodium persulfate, peracetic acid, perpropionic acid, perbutyric acid, benzoyl peroxide, diacetyl peroxide, cyclohexyl hydroperoxide, t-amyl hydroperoxide, di-t--butyl peroxide, dicumyl peroxide, methyl ethyl ketone peroxide.

Expecially suitable are hydrogen peroxide and sodium peroxide. The amount of per compound added can be between 0.5 and 10 weight percent, preferably between 0.5 and 6 weight percent, calculated as 100 percent hydrogen peroxide and based on the oven dry calculated weight of the cellulose used. The per compounds used in the first and third steps can be either the same or different. It is also possible to employ several per compounds together in a single step.

Chlorine dioxide is produced either separately or in the presence of cellulose by recovery from sodium chlorate or sodium chlorite in known manner and added in acid medium. It is essential to the process of the invention that only so much chlorine dioxide is used that the maximum consumption of chlorine in the entire process does not exceed 1 weight percent. The chlorine is calculated based on the amount of cellulose added. In the customary production of $ClO_2$ in cellulose plants it is possible to have contamination with small amounts of elemental chlorine, for example, 1 part $Cl_2$ to 10 parts $ClO_2$. This does not have a negative effect.

As an acid pretreatment there is meant a treatment as is employed in a similar manner in the oxygen bleach. It is preferably undertaken with sulfuric acid or sulfurous acid and then employed if the bleach should dissolve materials such as hemicelluloses which are difficult to remove.

The bleaching with the per compound is carried out in known manner at temperatures from 20° C. to the boiling point of the bleach liquor. In themselves naturally the bleaching can be carried out with pressure. However, the advantage of the process of adding per compounds and the named sequence is precisely in the ability of operating without the use of additional, i.e., superatmospheric pressure.

There can be added to the bleach liquor the customary inorganic complex builders or stabilizers such as, for example, water glass or magnesium sulfate or organic N or P containing complex builders such as, for example, ethylene-diamine tetraacetic acid, diethylenetriamine pentaacetic acid or nitrilotriacetic acid. There can likewise be used N and P free complex builders such as, e.g. polyhydroxy carboxylic acids as disclosed in published Haschke German Pat. application No. 1,904,940, Haschke published German Pat. application No. 1,904,941 and published Haschke German Pat. application No. 1,942,556. The entire disclosures of the three Haschke published German applications is hereby incorporated by reference. By the addition of organic complex builders the requirement for water glass can be completely eliminated so that the bleach waste water of the per step can be incorporated in the cooking liquor evaporation and combustion or chemicals recovery. This is valid in the use of NaOH or $Na_2CO_3$ as bases at least for sulfate cellulose plants and sodium sulfite cellulose plants, in the use of $Ca(OH)_2$ for calcium bisulfite cellulose plants and in the use of $NH_3$ for all sulfate and sulfite cellulose processes.

The following examples illustrate the invention. In the examples the percentages are always given as weight percent based on the unbleached, dry cellulose. As pulp consistency there is meant the weight percent of cellulose in the pulp. All experiments were carried out with tap water with addition of 100 grams of cellulose (dry weight) in enamelled containers, the pH values were measured at the beginning of the bleach. After each step the cellulose was washed with tap water and after the last step it was acidified with $SO_2$. The stated degree of whiteness (degree of remission) was determined by the German standard method (Zellcheming) with a Zeiss-Elrepho-Degree of Whiteness measurer, Filter R 46. The strength and freeness (Schopper-Riegler) were ascertained by the German standard methods.

EXAMPLE I

A spruce paper sulfite cellulose (degree of whiteness 59% MgO kappa number according to the Scandinavian standard method 23.7) was bleached in 5 steps under the following conditions:

First step: 1.3% $H_2O_2$, 2.0% NaOH, 3% waterglass, 65° C. 12% pulp consistency, 3 hours treatment;
Second step: 0.6% $ClO_2$, pH 3.5, 75° C., 12% pulp consistency, 1 hour treatment;
Third step: 0.75% $H_2O_2$, 1.5 NaOH, 3% waterglass, 65° C., pulp 12% pulp consistency, 4 hours treatment;
Fourth step: 0.4% $ClO_2$, pH 3.5, 75° C., 12% pulp consistency, 2 hours treatment;
Fifth step: 0.5% $H_2O_2$, 1.0% NaOH, 2% water glass, 65° C., 12% pulp consistency, 4 hours treatment.

The cellulose had a degree of whiteness of 92.9% MgO after the fifth step.

By Employing instead a temperature of 100° C. in each of the first, third and fifth steps a reaction time of only 20 minutes was needed. The degree of whiteness attained was 90.2% MgO.

In example I, for safety, water glass was added to prevent a decomposition of the hydrogen peroxide in the presence of heavy metal ions. Examles II and IV, however, show that with the tap water employed just as good bleaching resulted without water glass.

EXAMPLE II

The sulfite cellulose of the preceding example was bleached in 5 steps under the following conditions:

Step 1—1.3% $H_2O_2$, 2% NaOH, 65° C., 12% pulp consistency, 3 hour treatment;
Step 2—0.6% $ClO_2$, pH 3.5, 75° C., 12% pulp consistency, 1 hour treatment;
Step 3—0.75% $H_2O_2$, 1.5% NaOH, 65° C., 12% pulp consistency, 4 hour treatment;
Step 4—0.4% $ClO_2$, pH 3.7, 75° C., 12% pulp consistency, 4 hour treatment;
Step 5—0.5% $H_2O_2$, 1% NaOH, 65° C., 12% pulp consistency, 4 hour treatment.

After this bleaching sequence the cellulose had a degree of whiteness of 93.0% MgO.

EXAMPLE III

The cellulose added in the preceding examples was bleached for comparison with a conventional 5 step bleaching sequence as follows:

Step 1—4% $Cl_2$, 20° C., 4.5% pulp consistency, 1 hr. treatment;
Step 2—1.2% NaOH, 20° C., 4.5% pulp consistency, 1 hour treatment (extraction step);
Step 3—1.2% active chlorine in the form of sodium hypochlorite, pH 9.5, 38° C.;
Step 4—0.5% chlorine dioxide, pH 3.5, 75° C., 12% pulp consistency, 1.5 hour treatment;
Step 5—0.5% active chlorine in the form of sodium hypochlorite at pH 9.1, 38° C., 4.5% pulp consistency, 3 hr. treatment.

The cellulose after the 5 steps had a degree of whiteness of 91.9% MgO.

The cellulose bleached according to the conditions of example II (kappa number 23.7 had at a freeness of 30° Schopper-Riegler the following strength properties in percent based on the measured values for unbleached cellulose: breaking length 96.6%, tearing work according to Brecht-Imset 98.1%. The corresponding values for the same cellulose bleached according to example III are: breaking length 97.4% and tearing work according to Brecht-Imset 98.0%.

The decrease in degree of whiteness after 3 hours at 105° C. (heat yellowing) according to example II was 2.5% MgO, according to example III 7.3% MgO.

The loss of yield by bleaching in example II was 6.4%, in example III 6.1%, based on the unbleached cellulose.

However, it is possible without further to attain a degree of whiteness of over 90% MgO in three steps as is shown in following example IV.

EXAMPLE IV

An industrial, soft cooked spruce paper sulfite cellulose (kappa number 15.6) was bleached in 3 steps under the following described conditions (initial whiteness 50.3% MgO):

Step 1—1.3% $H_2O_2$, 2.0% NaOH, 0.12% diethylenetriamine pentaacetic acid, 65° C., 12% pulp consistency, 4 hours treatment;

Step 2—0.6% $ClO_2$, pH 4.0, 75° C., 12% pulp consistency, 4 hours treatment;

Step 3—0.75% $H_2O_2$, 1.5% NaOH, 0.12% diethylenetriamine pentaacetic acid, 65° C., 12% pulp consistency, 4 hours treatment.

The cellulose after the bleaching had a degree of whiteness of 91.4% MgO.

EXAMPLE V

The cellulose of example IV was bleached in a similar manner using water glass in place of the organic complex builder:

Step 1—1.3% $H_2O_2$, 2% NaOH, 3% water glass, 65° C., 12% pulp consistency, 4 hours treatment;

Step 2—0.6% $ClO_2$, pH 3.5, 75° C., 12% pulp consistency, 1.5 hr. treatment;

Step 3—0.75% $H_2O_2$, 1.5% NaOH, 3% water glass, 65° C., 12% pulp consistency, 4 hours treatment.

The cellulose after the third step had a degree of whiteness of 90.3% MgO.

EXAMPLE VI

The cellulose of examples IV and V was bleached without the use of water glass or complex builders or other stabilizing components under otherwise identical conditions concerning temperature, pulp consistency, reaction time and addition of chemicals. Of course in practice this is meaningful only in a water which is poor in heavy metal ions since otherwise a decomposition of the hydrogen peroxide can be disturbing. The cellulose had a degree of whitenss of 89.9% MgO after this three step bleach.

In contrast to a bleaching with oxygen in which step 1 and a conventional sequence series or also in contrast to a sequence such as step 1: oxygen, step 2: chlorine and chlorine dioxide (ratio chlorine : chlorine dioxide 20 : 1 to 5 : 1), step 3: oxygen, step 4: chlorine dioxide (Schalk, German Offenlegungsschrift 2,109,542), the new sequence described herein such as step 1: peroxide, step 2: chlorine dioxide, step 3: peroxide, step 4: chlorine dioxide, step 5: peroxide, has the advantage (among others) of being able to operate without superatmospheric pressure. Moreover, in the use of oxygen as the main bleaching agent, besides only lesser amounts of chlorine dioxide there are produced lower yields than in the new sequence as is shown in the following example.

EXAMPLE VII

The spruce paper sulfite cellulose of examples I - V was bleached as follows:

Step 1—10 atmospheres oxygen pressure, 4% NaOH, 0.5% MgO, 100° C., 25% pulp consistency, 90 minutes treatment;

after this step the cellulose had already lost 7.2 weight % based on the weight of the unbleached cellulose;

Step 2—0.6% chlorine dioxide, pH 4.5, 75° C., 12% pulp consistency; 4 hours treatment Step 3—0.3% NaOH, 75° C., 12% pulp consistency, 1 hr. treatment;

Step 4—4.0% $ClO_2$, pH 4.5, 75° C., 12% pulp consistency, 4 hr. treatment. After this treatment the cellulose had a degree of whiteness of 90.4% MgO at a total yield loss of 8.9 weight percent based on oven dried calculated cellulose.

The pulp consistency in the peroxide bleaching step also on principle can be below the values named in the examples. Generally, however, one can proceed so that to produce a specific degree of whiteness, so much the less hydrogen peroxide or also chlorine dioxide is used, the higher is the pulp density of the wet paper, that is the cellulose content. Also cellulose at a pulp consistency of 30 - 40 percent can be bleached with hydrogen peroxide if appropriate apparatus provisions are made.

By the use of only two bleaching agents, each of which, however, can be divided between two or three steps, there is the possibility to fashion in an especially economical manner the water conservation in the bleachery and in a given case in bleaching with excess bleaching agents, also the conservation of the chemicals by return and recycling, whereby there is obtained final bleach waste liquors with relatively high contents of dissolved organic materials. Thereby contents of 0.5 to 1.0% are already designated as high. The following example only indicates a manner in which the water passage can take place.

EXAMPLE VIII

The spruce paper sulfite cellulose which was the same as in examples I-III was bleached in five steps:

Step 1—1.3% $H_2O_2$, 2.6% NaOH, 60° C., 14% pulp consistency, 4 hours treatment;

Step 2—0.6% $ClO_2$, 70° C., 12% pulp consistency, 3 hrs. treatment;

Step 3—0.75% $H_2O_2$, 1.5% NaOH, 60° C., 14% pulp consistency, 4 hours treatment;

Step 4—0.4% $ClO_2$, 70° C., 12% pulp consistency, 3 hrs. treatment;

Step 5—0.5% $H_2O_2$, 1.0% NaOH, 60° C., 14% pulp consistency, 4 hours treatment.

There was always added in the peroxide bleaching step 1.2% of diethylenetriamine pentaacetic acid based on the weight of cellulose. After each bleaching step the pulp was diluted with tap water so that a cellulose suspension was formed containing 4.5 weight percent cellulose (calculated oven dried). Afterwards each time for the following step the composition was again partially dewatered and treated with a bleaching chemical solution so that the pulp during the bleach contained 12 weight percent or 14 weight percent cellulose corresponding to a pulp consistency of 12% or 14%. The filtrates recovered in the individual steps in the partial dewatering were used in diluting a pulp of 12 weight percent or 14 weight percent of cellulose to 4.5 weight percent cellulose in carrying out a five step bleach with the same cellulose and likewsie using the same conditions as in this example. Namely, the filtrate from the fifth step was used for dilution in the third step, and that from the third step was used for dilution in the first step. The filtrate from the fourth step was used for dilution in the second step. In this second bleaching sequence the amount of water used was 28 fold the amount of cellulose. With this amount of water it is a matter of the total wash and dilution water which is added proceeding from about 14% pulp consistency before the first bleaching step up to the dilution and rethickening to about 14% pulp consistency after the last bleaching step whereby, finally, a practically chlorine free waste water results from the peroxide step which contains the major amount of the materials dissolved by the bleaching. Besides this strongly brown colored waste water yields an only very weakly colored waste water from the chlorine dioxide step. The cellulose after this second five step bleaching has a degree of whiteness of over 90% MgO.

In the manner indicated in example VIII the water cycle, for example, through additional cycling in the individual steps, can be still more tightly closed so that based on the over dry calculated cellulose only 10 to 30 times the amount of waste water results. Besides, as already mentioned, the waste water from the peroxide bleaching steps, which contains the main amount of the materials dissolved in the bleaching, can be incorporated in the boiling lye evaporation and combustion or utilization. Since in the chlorine dioxide steps only a little chlorine (in the form of chlorine dioxide) is added - in the examples 0.6 - 1.0 weight percent chlorine dioxide content according 0.3 - 0.5 weight percent chlorine based on the unbleached cellulose — the amount of chlorine considered independent from the oxidation step can be disregarded which in industrial use of the new process can still reach the peroxide step. If necessary, the chlorine content of 0.3 - 0.5 weight percent (based on the cellulose), chiefly as NaCl, HCl or chlorolignin, in the waste water can be accepted in the entire comprehension, evaporation and utilization or burning of the entire bleach waste water and boiling waste liquor.

The 10 - 20 fold amounts of chlorine in the waste water occurring in the customary bleaching methods today, as stated chiefly NaCl, hydrochloric acid or chlorolignin lead to increased corrosion in the evaporation and in further working up. In the combustion of the evaporated waste water because of the high salt content, there results ashes of only limited value. In similar manner the high salt content would lead to products of comparatively little value in the isolation of the substances contained in the evaporated waste water, for example, by spray drying.

In using the new bleaching process and by, in combination with this bleaching process, a relatively problem free evaporation and working up — burning or spray drying — of the combined cook and bleach waste water, a biological clarifying plate is not required or, if employed, is at least greatly relieved. Therewith there is also eliminated the danger that chlorolignin or other difficulty decomposable lignin products reach the drainage despite biological clarification.

It is especially interesting and novel for the complete bleaching of cellulose to a degree of whiteness of 88% MgO, preferably even 90% MgO or higher, that according to the new environmentally favorable process, bleaching can be accomplished with such small amounts of chlorine. Besides, pulp of course can also be partially bleached by the new process.

The process is preferably carried out continuously.

It is also favorable that in the entire bleaching process there is only added and used 10 to 40 times the amount of wash and dilution water based on the cellulose to be bleached and also only a corresponding amount of waste water results. This was attained by recycling the wash or dilution water within the peroxide steps or the chlorine dioxide steps. Thus the wash or dilution water from the second step can be led back into the first peroxide step or chlorine dioxide step or can be returned from the third step into the third step into the second step or first step. Also inside a single step recycling is possible.

Unless otherwise indicated all parts and percentages are by weight.

What is claimed is:

1. A plural step process in the absence of superatmospheric pressure for a chlorine-poor complete bleaching of cellulose in an aqueous medium wherein the main bleaching agent is a per compound and using as the only bleaching agents chlorine dioxide and a per compound wherein the bleaching of the cellulose consists of bleaching in a first bleaching step in water with a per compound, then in a second bleaching step in water with chlorine doxide, and then in a third bleaching step again in water with a per compound, said process having alternating per compound and chlorine dioxide steps, beginning and finishing with per compound steps, the chlorine dioxide being employed in an amount to provide not over 1 weight percent of chlorine based on the oven dried weight of the cellulose employed.

2. A process according to claim 1 including the step of treating the cellulose with an acid prior to the first bleaching step.

3. A process according to claim 1 wherein the per compound is used in an amount of 0.5 to 10% calculated as 100% hydrogen peroxide and based on the oven dried weight of the cellulose employed.

4. A process according to claim 1 wherein there is included at least one additional chlorine dioxide or per compound step in water subsequent to said third step.

5. A process according to claim 4 wherein there is employed chlorine dioxide in a fourth bleaching step in water and a per compound in a fifth bleaching step in water.

6. A process according to claim 1 wherein the per compound is hydrogen peroxide, sodium peroxide or t-butyl hydroperoxide.

7. A process according to claim 5 wherein the amount of per compound is 0.5 - 6% by weight calculated as 100% hydrogen peroxide and based on the oven dried weight of the cellulose employed.

8. A process according to claim 1 wherein the bleaching is carried out in all of the steps at a temperature between 20° C. and the boiling temperature of the bleach liquor at atmospheric pressure.

9. A process according to claim 8 wherein the water employed in the process is 10 to 40 times the weight of cellulose to be bleached.

10. A process according to claim 9 wherein the water from the third bleaching step is returned to the first bleaching step.

11. A process according to claim 10 wherein chlorine dioxide is employed in a fourth bleaching step in water and the water from the fourth bleaching step is recycled to the second bleaching step.

12. A process according to claim 1 wherein the per compound is hydrogen peroxide or sodium peroxide.

13. A process according to claim 12 wherein the per compound is hydrogen peroxide.

14. A process according to claim 4 wherein the cellulose is sulfate cellulose.

* * * * *